UNITED STATES PATENT OFFICE.

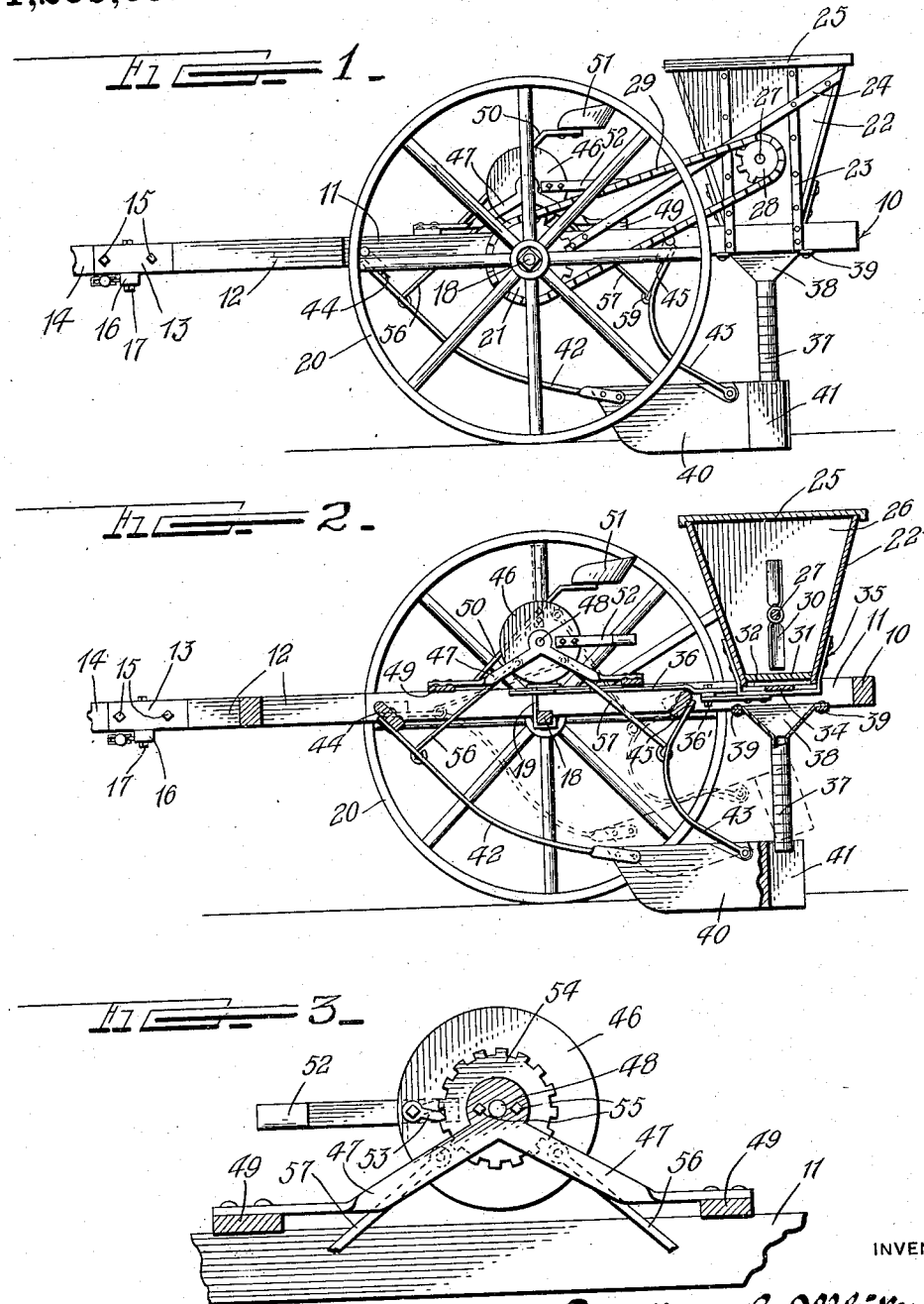

BRAXTON C. WHITE, OF MOORESBORO, NORTH CAROLINA.

FERTILIZING-MACHINE.

1,209,092.

Specification of Letters Patent. Patented Dec. 19, 1916.

Application filed December 22, 1915. Serial No. 68,227.

*To all whom it may concern:*

Be it known that I, BRAXTON C. WHITE, a citizen of the United States, residing at Mooresboro, R. F. D. No. 1, in the county of Rutherford and State of North Carolina, have invented certain new and useful Improvements in Fertilizing-Machines, of which the following is a specification.

This invention relates to an improved fertilizing machine of the type which is used for fertilizing grain and other small plants after the grain has sprouted and the principal object of the invention is to provide a fertilizer so constructed that the digging blades will be yieldably held in engagement with the ground and may if desired be raised out of engagement with the ground, a further object being to provide improved actuating means for the digging blades.

Another object of the invention is to so construct the blade carrying means that the blades may if necessary have independent vertical movement thus permitting the blades to accommodate themselves to the lay of the land over which the machine travels.

Another object of the invention is to so construct and mount the actuating means for the blade carrying means that the blades may be simultaneously moved into or out of engagement with the ground.

Another object of the invention is to provide a frame for the machine which will be simple in construction but at the same time very strong and durable.

Another object of the invention is to so construct the machine that the blade actuating means may be placed adjacent the driver's seat where they will be easy to reach.

This invention is illustrated in the accompanying drawings, wherein:—

Figure 1 is a view showing the machine in side elevation. Fig. 2 is a longitudinal vertical sectional view through the machine. Fig. 3 is a fragmentary view showing a portion of the blade actuating means.

The frame of this machine is substantially rectangular in shape and includes the rear bar 10, the side bars 11 and the converging forward bars 12 which terminate in arms 13 between which the inner end of tongue 14 is secured by means of bolts 15. This tongue 14 is of the usual length and construction and carries the draft equalizer 16 which is secured to the tongue by means of the pin or bolt 17. Axle 18 extends beneath the side bars 11 and is connected with the side bars by means of clamps 19. This axle extends beyond the sides of the machine and carries the wheels 20 and also carries a sprocket wheel 21 which rotates as the wheels revolve thus permitting rotary motion to be transmitted to the fertilizer agitating means to be hereinafter described.

Above the frame of the machine there is provided a fertilizer box 22 which is held in place by straps 23 and 24 and is provided with outlets positioned above the hoppers 38 of the spouts 37. A bar 34 extends beneath this fertilizer box and carries closure strip 33, an actuating lever 36 being provided so that the bar may be shifted to bring the closure strip to an operative position. In order to agitate the fertilizer in the box, there is provided a shaft 27 which carries paddles 30 and is provided at one end with a sprocket wheel 28 about which passes a sprocket chain 29. This sprocket chain passes around a sprocket wheel 21 carried by the axle of the machine and therefore as the machine moves forwardly, the fertilizer will be agitated.

The digging blades 40 which are to open the ground to permit the fertilizer to be placed beneath the surface of the ground, extend as shown in Figs. 1 and 2 when in an operative position and are provided with arms 41 which extend upon opposite sides of the spouts 37. These spreading arms open the ground and form small furrows into which the fertilizer will fall after which the soil will fall back into the furrows thus covering the fertilizer and preventing it from losing its strength by being exposed to the air. These digging blades 40 are carried by springs 42 and 43 which are rigidly secured to the rocker bars 44 and 45 pivotally mounted between the side bars 11. These springs serve to yieldably hold the digging blades in engagement with the ground but permit the blades to move vertically in case they strike obstructions such as rocks or the like. Therefore it is not necessary to raise all of the blades in case one of the blades should strike an obstruction. In order to regulate the depth to which the blades will cut and in order to permit the blades to be entirely raised out of engagement with the ground when moving the machine from one field to another there has been provided a latch lever including a disk 46 rotatably mounted between the bearing brackets 47 upon the pin or axle 48. These bearing brackets are carried by cross bars 49 carried by side bars 11, one of the bars 49 carrying the spring standard 50 of seat 51. A lever handle 52 is provided for disk 46 so that the disk may be turned to an adjusted position. Rods 56 and 57 are pivotally connected with the disk and have their end portions connected with the short arms 58 and 59 extending from the rocker bars 44 and 45. Therefore when the disk is turned by means of lever 52, the rocker bars 44 and 45 will be moved to raise or lower digging blades 40 according to the direction in which the disk is rotated.

When this fertilizing machine is in use the draft animals will be connected with the equalizer 16 and the machine drawn across the field with the digging blades passing between the rows of grain or plants. The disk will be turned to permit the blades to dig into the ground the desired amount and the lever 36 will be moved to open the outlets of the compartments in the fertilizer receptacle the desired amount. As the machine moves across the field, the agitators 30 through rotation of shaft 27 will keep the fertilizer in motion thus preventing it from clogging or from gathering in one portion of the compartment where it cannot pass out of the outlet openings. This fertilizer passes into the outlet spouts 37 and will drop into the small furrows opened by the digging blades. The earth will then fall back into the furrows thus covering the fertilizer. When the end of the field is reached, the digging blades can be raised by movement of disk 46 and after the machine is turned around, the blades can again be brought into engagement with the ground. Of course, while turning the machine around the lever 36 will be moved to close the outlet openings of the compartments in the receptacle thus preventing waste of fertilizer. It is of course obvious that if desired this machine could be used for feeding, the seed being placed in the compartments of the receptacle and fed through the spouts 37 into furrows dug in the field by the digging blades. Of course, if desired a mixture of seed and fertilizer could be placed in the receptacle.

I have thus provided a machine which can be used either for seeding or for cultivating the plants after they have sprouted. I have further provided a fertilizer machine which will operate very efficiently and in which the seed or fertilizer can be controlled and also the depth of the furrows cut, regulated.

What is claimed is:—

1. A machine of the character described including a frame, rocker shafts carried by said frame, digging blades, resilient strips carried by said rocker shafts and connected with said digging blades adjacent the forward and rear end portions thereof, and means for moving said rocker shafts to move said digging blades into and out of engagement with the ground.

2. A machine of the character described comprising a frame, digging blades, rocker shafts carried by said frame, strips extending from said rocker shafts and connected with said digging blades, bearing brackets carried by said frame, a disk rotatably mounted between said bearing brackets, a ratchet wheel, a pawl carried by said disk and engaging said ratchet wheel, rods extending from said disk and connected with said rocker shafts, and means for rotating said disk to move said rocker shafts and move the digging blades into and out of engagement with the ground.

In testimony whereof I affix my signature in presence of two witnesses.

BRAXTON C. WHITE.

Witnesses:
J. M. PADGETT,
J. B. WATKINS.